United States Patent
Hoeksel et al.

(10) Patent No.: US 8,706,163 B2
(45) Date of Patent: Apr. 22, 2014

(54) CHIP CARDS PROVIDING TRUSTED TIME REFERENCES

(75) Inventors: Sebastian Hoeksel, Maastricht (NL);
Najib Koraichi, Schimmert (NL);
Patrick H. Waters, Redlynch Salisbury (GB)

(73) Assignee: Vodafone Holding GmbH, Dusseldorf (DE)

( * ) Notice: Subject to any disclaimer, the term of this patent is extended or adjusted under 35 U.S.C. 154(b) by 275 days.

(21) Appl. No.: 13/226,178

(22) Filed: Sep. 6, 2011

(65) Prior Publication Data

US 2012/0086600 A1 Apr. 12, 2012

(30) Foreign Application Priority Data

Sep. 14, 2010 (EP) ..................................... 10176565

(51) Int. Cl.
*H04B 1/38* (2006.01)

(52) U.S. Cl.
CPC ............ *H04B 1/3816* (2013.01); *H04B 1/3827* (2013.01); *H04M 2250/14* (2013.01)
USPC ........ 455/558; 455/557; 455/556.2; 455/502; 455/456.1; 455/412.1; 342/357.21; 342/357.22; 342/357.25; 342/357.48; 370/350; 370/343; 370/503

(58) Field of Classification Search
CPC .. H04B 1/3816; H04B 1/3827; H04B 1/3833; H04M 2250/14
USPC ................ 455/558, 557, 556.1, 556.2, 575.1, 455/456.1–457, 500, 517, 414.1–414.4, 455/426.1, 426.2, 502, 572, 574; 342/357.21, 357.22, 357.25, 357.48; 370/350, 343, 503
See application file for complete search history.

(56) References Cited

U.S. PATENT DOCUMENTS

| | | | |
|---|---|---|---|
| 6,535,750 B1 * | 3/2003 | Van Gen ........................ | 455/558 |
| 6,593,878 B2 * | 7/2003 | Fall .............................. | 342/357.4 |
| 2002/0082992 A1 * | 6/2002 | Ritter ............................... | 705/41 |
| 2003/0094924 A1 * | 5/2003 | Oh ................................. | 320/128 |
| 2005/0094471 A1 * | 5/2005 | Obana et al. ................... | 365/222 |
| 2008/0091900 A1 * | 4/2008 | Imai et al. ...................... | 711/163 |
| 2013/0120109 A1 * | 5/2013 | Libin et al. ...................... | 340/5.7 |

* cited by examiner

*Primary Examiner* — Keith Ferguson
(74) *Attorney, Agent, or Firm* — International IP Law Group, PLLC

(57) ABSTRACT

The subject innovation relates to a chip card to be inserted in terminals. An exemplary embodiment of the chip card includes a clock unit to provide a time reference and an internal power source to at least run the clock unit in case of absence of an external power source. The exemplary chip card also includes a signal receiver to receive a satellite navigation signal comprising a satellite time signal, the signal receiver being connected to the clock unit in order to synchronize the clock unit with the satellite time signal to enable the clock unit to provide the time reference as a trusted absolute time reference independently from a position of the chip card.

12 Claims, 1 Drawing Sheet

CHIP CARDS PROVIDING TRUSTED TIME REFERENCES

CROSS-REFERENCE TO RELATED APPLICATION

This application claims priority to European (EP) Patent Application No. 10 176 565.9, filed on Sep. 14, 2010, the contents of which are incorporated by reference as if set forth in their entirety herein.

BACKGROUND

Removable chip cards are used in terminals, e.g. mobile communication terminals such as mobile phones, to securely store keys used to identify a subscriber in a mobile network (such as mobile phones networks and/or the internet). As an example, the chip cards assigned to a user allow users to change mobile phones by simply removing the chip cards from one mobile phone and inserting it into another mobile phone or broadband telephony device. As an example, the mobile phone and a SIM-card as the chip card forms a mobile station able to communicate in a mobile phone network.

In order to be able to provide a time signal as a time reference, chip cards can be equipped with clock units. Such chip cards may comprise a battery to run the clock unit even if the external power supply of the chip card (e.g. provided by the terminal power supply) is interrupted. This is usually the case, when the terminal is turned off. Thus the clock unit can be configured as an essentially autarkic system providing tamper-resident time information (or time reference). However, to provide an absolute time signal, the clock has to synchronized at least one time, e.g. at production time of the chip card. This approach has the disadvantage, that the chip card's internal battery might run empty before starting to use the chip card in a terminal. Often the time between production of chip cards and the start of use is undetermined On the other hand, the recharging intervals for the battery of the chip card might be insufficient when using the terminal only rarely. An empty battery would result in a loss of the synchronized time even when synchronized one time. The synchronization of the time signal may also be performed using the time reference of the terminal, where the chip card is inserted to. However, one important feature of the chip cards is its possibility of being interchanged between different terminals eventually providing deviating time references (e.g. according to deviating local times) making a trusted absolute time reference for the interchanged chip card impossible. Also the time provided by a terminal may be set by the user of the terminal preventing any trusted absolute time reference. An alternative solution to provide an absolute trusted time signal would be a connection of the chip card to a remote network time server. The challenge with this approach is that this would require the ubiquitous availability of a mobile network connection and more important it will introduce dependencies on another element in the security architecture to provide an absolute trusted time reference. The other element must be auditable, always online and available during the lifetime of all chip cards. In addition the chip card would require storage of credentials needed to authenticate the remote network time server to make sure, that the received time reference is not manipulated.

SUMMARY

The subject innovation relates to a chip cards providing requiring trusted time references, terminals where these chip cards are inserted and a method to operate such a chip card.

The subject innovation may provide a chip card providing a trusted absolute time reference independently from its position, a terminal with such a chip card and a method to operate such a chip card.

An exemplary chip card may be suitable to be inserted in terminals. The exemplary chip card comprises a clock unit to provide a time reference, an internal power source to at least run the clock unit in case of absence of an external power source, and a signal receiver to receive a satellite navigation signal comprising a satellite time signal, wherein the signal receiver is connected to the clock unit in order to synchronize the clock unit with the satellite time signal to enable the clock unit to provide the time reference as a trusted absolute time reference independently from the position of the chip card. Via the integrated signal receiver, the chip card has access to an accurate time reference, which is used to synchronize the trusted absolute time reference provided by the clock unit. The trusted time reference provided by the chip card is no longer dependent on an external supplied network time. Since the satellite time signal of the satellite navigation system is available worldwide, the possibility to provide the trusted absolute time reference is independent from the position of the chip card.

The clock unit may be any suitable clock unit for chip cards. The clock unit may comprise an electronic oscillator, which may be regulated by a quartz crystal. The clock unit may be set the first time at the time of manufacturing of the chip card or when the chip card is used first or when the chip card is delivered. The clock unit is continuously measuring time so that current time reference (time information) can always be provided. The time reference is relative to a specific point in time. Together with an absolute time signal received from the environment the satellite time-signal provides an absolute point in time. Synchronizing the clock unit with the satellite time as part of the satellite navigation signal results in a trusted absolute time reference provided by the clock unit, which is independent from the position of the chip card. The clock unit might be integrated into the secure hardware environment of the chip card to prevent tampering of the time reference.

In order to be able to continuously measure time, the clock unit is continuously supplied with power. In order to provide a continuous power source, an internal power source is integrated into the chip card. The internal power source may be any internal power source suitable for chip cards. The power supply by the internal power source might be switched off in case of available external power sources in order to safe power. Preferably, the internal power source is integrated into the body of the chip card together with a microcontroller and the clock unit without enlarging the dimensions of the chip card, which might be determined by a standardized format. The internal power source may be a rechargeable battery comprising one or more battery cells. The battery is small and thin enough to be integrated into the body of the chip card. For instance, the power source may be a foil battery, a RHISS battery (RHISS: Rechargeable Hydrogen Ion Solid State) or a thin-film battery.

The connections within the chip card in order to at least connect the internal power source, clock unit and signal receiver might by any suitable electrical conductive paths. Skilled people will choose the suitable connections within the scope of the subject innovation.

The satellite navigation signal is provided by a space-based global navigation satellite system that provides reliable location and time information in all weather and at all times and anywhere on or near the Earth when and where there is an unobstructed line of sight to at least one navigation satellite for receiving time information. For determining the position of the signal receiver, signals from at least three satellites (better four or more) have to be received. The satellite navigation system is freely accessible by anyone with a suitable signal receiver. The satellite navigation system provides a satellite navigation signal comprising a satellite time signal as time reference utilized to calculate the position of the signal receiver on earth, but can be used also to provide a time reference. The very accurately computed time signal is used in this invention to synchronize the clock unit at the chip card. Examples for satellite navigation system are the so-called Global Positioning System (GPS), the based global satellite navigation systems "Galileo" or "GLONASS." As an example, the time signal provided by the GPS-system refers to one unique time system, the so-called GPS-time. GPS time was set to match Coordinated Universal Time (UTC) in 1980. In the GPS time, also the deviation between UTC- and GPS-time is given. The accuracy of the GPS-time in combination with the given deviation to the UTC-time guarantees accuracies better than one microsecond to the UTC-time. As opposed to the year, month, and day format of the Gregorian calendar, the GPS date is expressed as a week number and a seconds-into-week number. The advantage of the satellite based time signal is that it cannot be tampered. Subsequently, alternative measures like encrypting required for receiving alternative time signals from other sources used for synchronizing the clock unit can be avoided.

In case of no available satellite navigation signal, e.g. in some houses or below earth, the clock unit will provide time references according to the internal clock time according to the last executed synchronization of the clock unit due to the absent of usable time data for further synchronizations. The time provided by the clock unit internally is accurate enough to bridge certain time periods without a connection to a satellite navigation system.

Signal receivers to receive satellite navigation signals suitable for chip cards are available on the market today. In general, such signal receivers are composed of an antenna, tuned to the frequencies transmitted by the satellites and receiver-processors. Some of these signal receivers may also comprise a separate highly stable clock (often a crystal oscillator) processing the satellite time-signal. This clock might not be continuously powered by the power source of the chip card. A power supply to the signal receiver may only be provided during the step of receiving the satellite navigation signal, which might be executed only from time to time, e.g. periodically after certain time intervals, in order to save power to bridge longer time intervals, where the chip card is stored separate from a terminal. Therefore the clock of the signal receiver can only be considered as additional clock for receiver purposes. In an alternative solution, the clock unit might be synchronized with the time-signal of the clock of the signal receiver after synchronizing the clock of the signal receiver with the satellite navigation signal during the on-phase of the signal receiver (on-phase =time, where the signal receiver is continuously power by the internal or external power source). As an example for signal receiver according to the present invention SIM-card embedded GPS-receivers with integrated antenna for providing accurate positioning information are available from Sagem Orga and BlueSky Positioning.

Chip cards might be used to provide stored features to identify a subscriber in a mobile network. As an example, such features are a sequence of characters (e.g. numbers) or keys. In an embodiment, the chip card is a SIM-card, a USIM-card, LTE-cards or a smart card. A SIM-card is a chip card, which is inserted into a mobile phone in order to identify the user of the mobile phone. A subscriber identity module (SIM) on the removable SIM card securely stores the service-subscriber key (IMSI). The SIM card contains its unique serial number, internationally unique number of the mobile user (IMSI), security authentication and ciphering information, temporary information related to the local network, a list of the services the user has access to and two passwords (PIN for usual use and PUK for unlocking). A Universal Subscriber Identity Module (USIM) is an application for UMTS mobile telephony. USIM-cards store user subscriber information, authentication information and provide storage space for text messages and phone book contacts. For authentication purposes, the USIM- card stores long-term pre-shared secret key K, which is shared with the Authentication Center (AuC) in the network. The USIM also verifies a sequence number that must be within a range using a window mechanism to avoid replay attacks, and is in charge of generating the session keys CK and IK to be used in the confidentiality and integrity algorithms of the KASUMI block cipher in UMTS. The USIM-Cards is the equivalent to the SIM-card for UMTS mobile telephony. A smart card is any pocket-sized card with embedded integrated circuits (ICCs). There are two broad categories of ICCs. Memory cards contain only non-volatile memory storage components, and perhaps dedicated security logic. Microprocessor cards contain volatile memory and microprocessor components. The card is made of plastic. Smart cards provide strong security authentication for single sign-on within large organizations. LTE card are cards supporting the 3GPP Long Term Evolution (LTE) technology, defined as 3.9G (other names are High Speed OFDM Packet Access (HSOPA), E-UTRAN (Evolved UTRAN) and Super 3G) as standard for mobile communication to succeed the UMTS standard.

In an exemplary embodiment the chip card is adapted to periodically synchronize the clock unit based on the received the satellite time signal. The satellite navigation signal comprising the satellite time signal providing a worldwide absolute time reference can be received by the chip card continuously worldwide. The provided accuracy of the satellite time signal far exceeds the required accuracy of the absolute time reference to be provided by the chip card. Therefore, the synchronization period may vary between seconds, minutes, days, and weeks depending on the application. The periodic synchronization minimizes or prevents the risk of a provided time reference being not a correct absolute time reference, e.g. when exchanging the chip card between different terminals, internal power sources of chip card running empty or placing the terminal for a limited period of time in a location, where no satellite navigation signal could be received. In case of no available satellite navigation signal, no synchronization will be executed.

In an exemplary embodiment, the chip card comprises an external interface suitable to establish a connection to a terminal when inserted into the terminal or connected to the terminal. Skilled people will choose the suitable interface within the scope of the subject innovation. In an exemplary embodiment, the chip card is adapted to allow a recharging of the internal power source via the external interface. When a chip card is inserted into a terminal, the chip card is able to recognize via the external interface, that it is connected to the terminal (e.g. be receiving a corresponding signal from the terminal or by simply detecting a change of electrical parameter). The terminal usually provides an external power source for the components of the chip card. When this external power source is available for the chip card, the internal power source may be switched from a power supply mode to a re-charge mode in order to be recharged, preferably fully recharged, before removing the chip card again from the terminal. A recharged internal power source is able to operate the clock unit for a long time separate from a terminal providing trusted absolute time references. To switch of the internal power source if an external power source is available, the chip card may further comprise a microcontroller. The microcontroller might be adapted to execute or operate further components or applications. The microcontroller of the chip card may be configured to switch the internal power source to a supply via the external interface of the chip card, when it is determined that the terminal is operating. This may be done by connecting the clock unit to the power terminal of the external interface. When the microcontroller determines that the terminal is switched off, it connects the clock unit via the chip card to a terminal power source outside the chip card supplying power to the clock unit.

In an exemplary embodiment, the clock unit is integrated into the secure hardware environment of the chip card. Thus, tampering of the time reference can be prevented. Additionally, the clock unit may itself be protected against tampering by suitable measures.

The subject innovation further relates to a terminal with a chip card as set forth herein. The terminal comprises a cavity to reversibly accommodate the chip card and providing a terminal interface to connect the chip card to the terminal and a terminal power source to supply power to the chip card when inserted into the terminal. In an exemplary embodiment, the terminal power source is adapted to recharge the chip card when inserted into the terminal. The terminal power source (or external power source from the point of view of the chip card) might be any suitable power source, e.g. one or more rechargeable batteries. The size of the cavity might be adapted to the geometrical size of the chip cards. Any usage of the terminal can be assigned with the trusted absolute time reference provided by the clock unit of the chip card e.g. to record the actions made on this terminal. In an exemplary embodiment, the terminal is a mobile communication device, e.g. a mobile phone. Here, the chip card supplies stored service-subscriber keys and eventually additional required data via the mobile communication device to the mobile network provider in order to be able to communicate via this network.

In an embodiment, the terminal comprises a trigger unit to trigger a synchronization of the clock unit of the chip card when inserted into the terminal. This trigger unit will force the chip card eventually outside the regular periodic synchronization cycle of the clock unit to immediately synchronize the clock unit of the chip card after being inserted into the terminal. Even in case of inserted chip cards with an empty internal power source and the corresponding loss of a time reference from the clock unit of the chip card, a trusted absolute time reference is directly available after the triggered synchronization for any desired assignment the first action executed with the terminal with this trusted absolute time reference. The triggering unit might be a separate component of the terminal or a software program running on a chip present in the terminal.

The subject innovation further relates to a method to operate a chip card as described herein to provide a trusted absolute time reference independently from the position of the chip card, comprising the steps of:
running a clock unit on the chip card comprising an internal power source to at least power the clock unit,
receiving a satellite navigation signal with the chip card comprising a satellite time signal with a signal receiver,
synchronizing a time reference of the clock unit with the satellite rime signal order to enable the clock unit to provide a trusted absolute time reference.

In an exemplary embodiment of the method, the step of receiving the satellite navigation signal and the step of synchronizing the clock unit are repeated periodically. In another exemplary embodiment, the step of synchronizing the clock unit is triggered by inserting the chip card into a cavity to reversibly accommodate the chip card in a terminal according to the present invention or by switching on the terminal In order to provide a trigger starting the synchronization, the terminal comprises a triggering unit. In another exemplary embodiment of the method, recharging of the internal power source of the chip card is performed after inserting the chip card into a terminal.

BRIEF DESCRIPTION OF THE DRAWINGS

The aforementioned and other aspects of the invention will also be apparent from and elucidated with reference to the embodiments of the invention described hereinafter making reference to the drawings.

DETAILED DESCRIPTION OF SPECIFIC EMBODIMENTS

Figure 1:
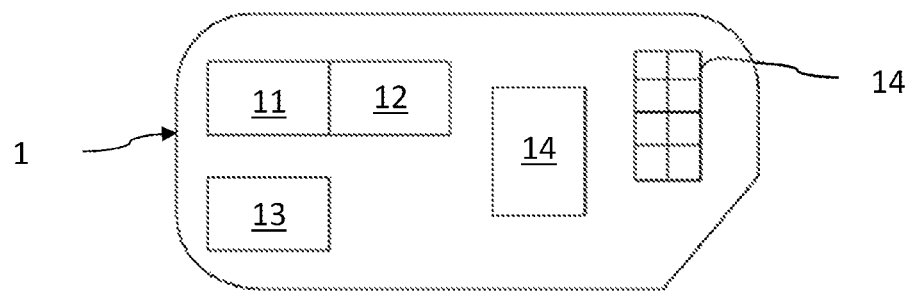
FIG. 1 is a block diagram of an exemplary embodiment of a chip card according to the subject innovation.

FIG. 1 shows an embodiment of a chip card 1 according to the subject innovation suitable to be inserted in terminals 2 in order to provide stored keys to identify a subscriber comprising a clock unit 11 to provide a time reference, an internal power source 12 to run the components of the chip card, especially the clock unit 11, in case of absence of an external power source 22, and a signal receiver 13 e.g. to receive a satellite navigation signal comprising a satellite time signal, wherein the signal receiver 13 is connected to the clock unit 11 in order to synchronize the clock unit 11 with the satellite time signal to enable the clock unit 11 to provide the time reference as a trusted absolute time reference independently from the position of the chip card 1. In this embodiment the chip card 1 further comprises a microcontroller 15 adapted to periodically synchronize the clock unit 11 based on the received the satellite time signal. The chip card 1 further comprises an external interface 14 suitable to establish a connection to a terminal 2 when the chip card is inserted into the terminal 2. In order to be operational separate from a terminal 2 over a certain time period, the chip card 1 is adapted to allow a recharging of the internal power source via the external interface 14. Therefore the microcontroller 15 also switches off the internal power source 12 if an external power source 22 is available. The microcontroller 15 further allows integration of the clock unit 11 into the secure hardware environment of the chip card 1 in order to provide a trusted absolute time reference without a possibility to tamper the time reference.

Figure 2:
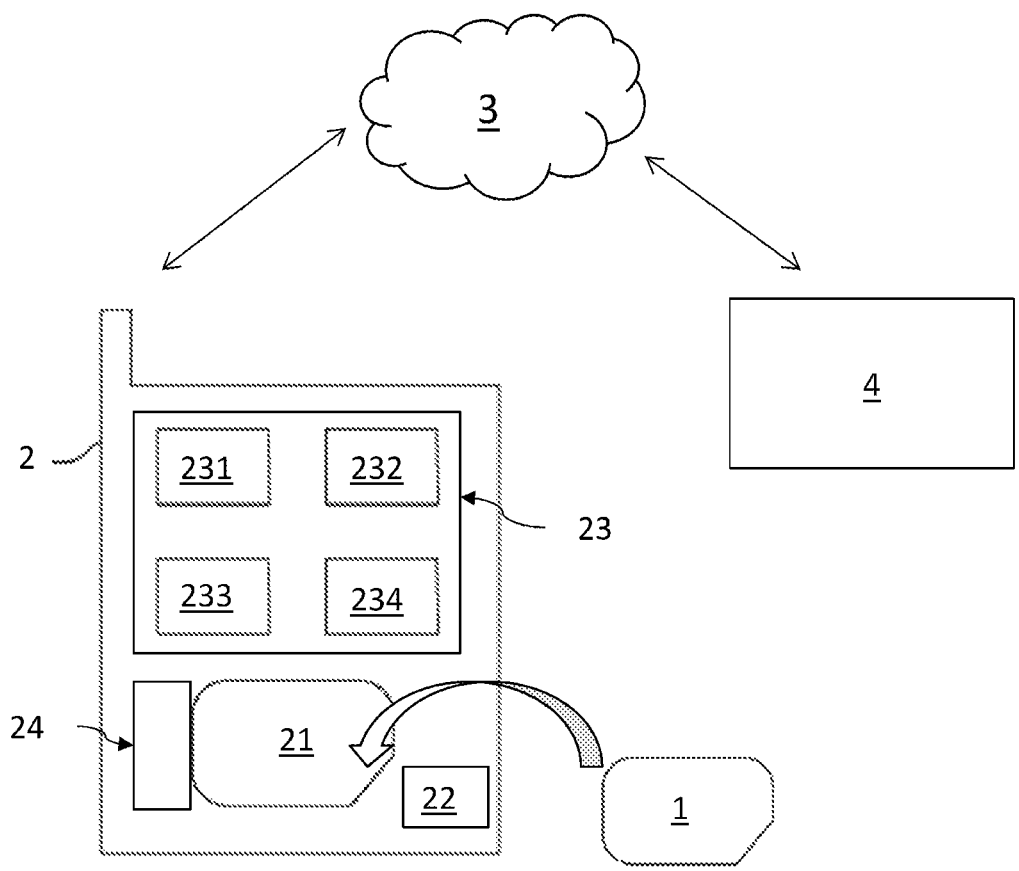
FIG. 2 is a block diagram of an exemplary embodiment of a terminal according to the subject innovation as part of a communication network.

FIG. 2 shows a mobile communication device 2 as an embodiment of the terminal according to the subject innovation comprising the chip card 1, a cavity 21 (or card reader) to reversibly accommodate the chip card 1, a terminal interface 24 to connect the chip card 1 to the terminal 2 and a terminal power source 22 to supply power to the chip card 1 when inserted into the terminal 2. The mobile communication device 2 can be connected to a mobile communication network (PLMN—Public Land Mobile Network) 3, which may be configured according to the GSM or UMTS standard, for example (GSM: Global System for Mobile Communications;

UMTS: Universal Mobile Telecommunications System) with the chip card 1 as SIM-card, USIM-card, LTE-card or smart card 10. The terminal power source 22 is adapted to recharge the internal power source 12 (e.g. a rechargeable battery) of the chip card 1 when inserted into the terminal 2.

The terminal 2 further comprises a terminal unit 23 comprising components, which may not belong to the chip card 1. As an example for connecting the mobile communication device 2 to the PLMN 3, the terminal unit 23 comprises a radio interface 231. The radio interface 231 is coupled to a processor 232 of the terminal unit 23. For interacting with the mobile user, the terminal unit 23 comprises a user interface 233, which may include one or more input components and one or more output components and which is coupled to the processor 232. For supplying the components of the terminal unit 23 and also the chip card 1 with power, the terminal 2 comprises a terminal power source 22, which may be configured as a rechargeable battery. The terminal unit 23 further comprises a trigger unit 234 to trigger a synchronization of the clock unit 11 of the chip card 1 when inserted into the terminal 2. Alternatively the trigger unit 234 might be a unit separate from the terminal unit 23 or might be arranged in the chip card 1.

The terminal unit 23 interacts with the chip card 1 via a terminal interface 24, where the external interface 14 of the chip card 1 is connected to. The chip card 1 comprises an identification module allocated to a subscription of the mobile user to the PLMN 3. The identification module includes information for identifying and/or authenticating the subscribed user to the PLMN 3 and provides functionality for accessing services of the PLMN 3. The subscriber identification module may be configured in accordance with the type of the PLMN 3. If the PLMN 3 is a GSM or UMTS network, the subscriber identification module is a Subscriber Identity Module (SIM) according to the GSM standard or a Universal Subscriber Identity Module (USIM) according to the UMTS standard and the chip card 1 is a SIM-card or a USIM-card.

Preferably, the internal power source 12 of the chip card 1 can be charged by connecting it to the power circuit of the terminal 2 via the external interface 14 of the chip card 1, while the chip card 1 is supplied with power by the terminal power source 22. Thus, in the usual use of the mobile communication device 2, the internal power source 12 of the chip card 1 can be charged regularly from the terminal power source 22 of the terminal 2. Preferably, the charging is controlled by a power management unit of the microcontroller 15 of the chip card 1. The power management unit may dispose of a mechanism to determine the state-of-charge of the internal power source 12, and if it is judged that the capacity of the internal power source 12 is below a predetermined threshold, charging is done. The microcontroller 15 may be supplied with power by the terminal 2. The terminal power source 22 supplies power to the chip card on demand, when the power management unit is requesting a recharging.

The trusted absolute time reference provided by the chip card 1 might be assigned to an action of a user of the terminal 2 or might be provided to the terminal for further processing by applications of the terminal or provided to the mobile network. As an example a required user authorisation in an authorisation unit 4 might be performed using time-synchronised passwords so that a high level of security of the access control is achieved. For generating time-synchronised passwords, the mobile communication device 2 comprises a corresponding application, where the trusted absolute time reference can be used for. This application may be resident in the terminal 23 and run on the terminal's processor 232. In a different embodiment, this application is resident in the chip card 1 including the subscriber identification module. This has the advantage that this application is secured against unauthorized access via the security mechanism of the chip card 1. In further embodiments, a chip including this application may be removable connected to the terminal 2. This password application retrieves the time information needed for generating the time-synchronised passwords from the clock unit 11 of the chip card 1 providing the trusted absolute time reference. As is shown in FIG. 1, the chip card 1 comprises a microcontroller 15, which includes a programmable processor unit for executing software applications and a memory for storing reference data and program code that is executable in the processor unit. The external interface 14 allows a data exchange between the microcontroller 15 and the terminal 2 as an external device.

The microcontroller 15 provides a secure environment for the execution of application and the storage of data comprising the trusted absolute time references. Particularly, this means that unauthorized access to data and processes is prevented due to the hardware design of the microcontroller 15 and due to cryptographic mechanisms used for managing data in the microcontroller 15. Moreover, the microcontroller 15 is integrated into a secure hardware environment provided by the chip card 1, which is physically protected against manipulations, such as power analysis, reverse engineering etc. The microcontroller 15 may provide the subscriber identification module of the chip card 1 and it may also store and execute the password application, when it is not executed in the terminal unit 23 of the mobile communication device 2. Thus, the password application is secured against tampering via the security features of the chip card 1 and its microcontroller 15.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

What is claimed is:

1. A chip card to be inserted in terminals, the chip card comprising:
   a clock unit to provide a time reference;
   an internal power source to at least run the clock unit in case of absence of an external power source;
   a signal receiver to receive a satellite navigation signal comprising a satellite time signal, the signal receiver being connected to the clock unit in order to synchronize the clock unit with the satellite time signal to enable the clock unit to provide the time reference as a trusted absolute time reference independently from a position of the chip card; and
   wherein the chip card is adapted to receive a trigger signal to trigger a synchronization of the clock unit of the chip card from a trigger unit of a terminal when inserted into the terminal.

2. The chip card recited in claim 1, in which the chip card is a SIM-card, a USIM-card, a LTE-card or a smart card.

3. The chip card recited in claim 1, in which the chip card periodically synchronizes the clock unit based on the received the satellite time signal.

4. The chip card recited in claim 1, comprising an external interface that establishes a connection to a terminal when inserted into the terminal.

5. The chip card recited in claim 4, in which the chip card allows a recharging of the internal power source via the external interface.

6. The chip card recited in claim 1, comprising a microcontroller to at least switch off the internal power source if an external power source is available.

7. A terminal, comprising:
   a chip card to be inserted in terminals, the chip card comprising:
      a clock unit to provide a time reference;
      an internal power source to at least run the clock unit in case of absence of an external power source; and
      a signal receiver to receive a satellite navigation signal comprising a satellite time signal, the signal receiver being connected to the clock unit in order to synchronize the clock unit with the satellite time signal to enable the clock unit to provide the time reference as a trusted absolute time reference independently from a position of the chip card;
   a cavity to reversibly accommodate the chip card and providing a terminal interface to connect the chip card to the terminal;
   a terminal power source to supply power to the chip card when inserted into the terminal; and
   a trigger unit to trigger a synchronization of the clock unit of the chip card when inserted into the terminal.

8. The terminal recited in claim 7, wherein the terminal is a mobile communication device.

9. The terminal recited in claim 7, wherein the terminal power source recharges the chip card when inserted into the terminal.

10. A method of operating a chip card to provide an absolute time reference independently from a position of the chip card, comprising:
   running a clock unit on the chip card comprising an internal power source to at least power the clock unit;
   receiving a satellite navigation signal with the chip card comprising a satellite time signal with a signal receiver;
   synchronizing a time reference of the clock unit with the satellite rime signal order to enable the clock unit to provide a trusted absolute time reference; and
   triggering synchronizing of the time reference by inserting the chip card into a cavity to reversibly accommodate the chip card in a terminal.

11. The method recited in claim 10, comprising periodically repeating the step of receiving the satellite navigation signal and the step of synchronizing the clock unit.

12. The method recited in claim 10, comprising recharging the internal power source of the chip card after inserting the chip card into a terminal or by switching on the terminal.

* * * * *